US012775806B2

(12) United States Patent
Mishra et al.

(10) Patent No.: US 12,775,806 B2
(45) Date of Patent: Oct. 27, 2026

(54) EFFICIENT TRAINING AND UTILIZATION OF LARGE LANGUAGE MODELS

(71) Applicant: GOOGLE LLC, Mountain View, CA (US)

(72) Inventors: Swaroop Mishra, Mountain View, CA (US); Ragha Kotikalapudi, San Jose, CA (US); Sahitya Potluri, Sunnyvale, CA (US); Taylor Bos, Santa Clara, CA (US); YaGuang Li, Sunnyvale, CA (US); Hanzhao Lin, Cupertino, CA (US); Steven Zheng, San Bruno, CA (US); Yu Du, Sunnyvale, CA (US); Chen Zhu, Palo Alto, CA (US); Chenkai Kuang, Sunnyvale, CA (US); Xinying Song, Kirkland, WA (US); Heng-Tze Cheng, Mountain View, CA (US); Ed H. Chi, Los Altos, CA (US); Quoc Le, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 259 days.

(21) Appl. No.: 18/378,434

(22) Filed: Oct. 10, 2023

(65) Prior Publication Data

US 2025/0045534 A1 Feb. 6, 2025

Related U.S. Application Data

(60) Provisional application No. 63/530,553, filed on Aug. 3, 2023.

(51) Int. Cl.

*G06F 40/20* (2020.01)
*G06F 40/30* (2020.01)
*G06F 40/40* (2020.01)

(52) U.S. Cl.

CPC .............. *G06F 40/40* (2020.01); *G06F 40/20* (2020.01); *G06F 40/30* (2020.01)

(58) Field of Classification Search

None

See application file for complete search history.

(56) References Cited

U.S. PATENT DOCUMENTS

2024/0346254 A1* 10/2024 Liu .......................... G06F 40/40
2024/0403343 A1* 12/2024 Ramanasankaran ... G05B 15/02

OTHER PUBLICATIONS

Wang, L., Xu, W., Lan, Y., Hu, Z., Lan, Y., Lee, R. K. W., & Lim, E. P. (2023). Plan-and-solve prompting: Improving zero-shot chain-of-thought reasoning by large language models. arXiv preprint arXiv:2305.04091. (Year: 2023).*

(Continued)

*Primary Examiner* — Paras D Shah
*Assistant Examiner* — Mulugeta Tuji Dugda
(74) *Attorney, Agent, or Firm* — Gray Ice Higdon

(57) ABSTRACT

Implementations relate to a method implemented by one or more processors, the method including: receiving natural language (NL) based input associated with a client device; generating, using a large language model (LLM) and based on processing the NL based input, LLM output; determining, based on the LLM output, a sequence of LLM responses, the sequence of LLM responses including at least one intermediate LLM response and a final LLM response. In some implementations, the method may further include causing the final LLM response to be rendered at the client device. In additional or alternative implementations, the method may further include storing, as an instance of training data for fine-tuning the LLM or an additional LLM, the NL based input along with the final LLM response.

19 Claims, 11 Drawing Sheets

(56) References Cited

OTHER PUBLICATIONS

Kojima, T., Gu, S. S., Reid, M., Matsuo, Y., & Iwasawa, Y. (2022). Large language models are zero-shot reasoners. Advances in neural information processing systems, 35, 22199-22213. (Year: 2022).*

Wei, Jason, Xuezhi Wang, Dale Schuurmans, Maarten Bosma, Fei Xia, Ed Chi, Quoc V. Le, and Denny Zhou. "Chain-of-thought prompting elicits reasoning in large language models." Advances in neural information processing systems 35 (2022): 24824-24837. (Year: 2022).*

Gur, Izzeddin, Ofir Nachum, Yingjie Miao, Mustafa Safdari, Austin Huang, Aakanksha Chowdhery, Sharan Narang, Noah Fiedel, and Aleksandra Faust. "Understanding html with large language models." arXiv preprint arXiv:2210.03945 (2022): Revised May 2023 (Year: 2023).*

Wang, L. et al., "Plan-and-Solve Prompting: Improving Zero-Shot Chain-of-Thought Reasoning by Large Language Models"; arXiv.org, Cornell University; arXiv:2305.04091v1; 24 pages; dated May 6, 2023.

Huang, J. et al., "Large Language Models Can Selfl-Improve"; arXiv.org, Cornell University; arXiv:2210.11610v2; 19 pages; dated Oct. 25, 2022.

Yan, T. et al., "Refining the Responses of LLMs by Themselves"; arXiv.org, Cornell University; arXiv.:235.04039; 7 pages; dated May 6, 2023.

Madaan, A. et al., "Self-Refine: Iterative Refinement with Self-Feedback"; arXiv.org, Cornell University; arXiv:2303.17651v2; 54 pages; dated May 25, 2023.

European Patent Office; International Search Report and Written Opinion issued in Application No. PCT/US2024/035246; 11 pages; dated Oct. 21, 2024.

* cited by examiner

EFFICIENT TRAINING AND UTILIZATION OF LARGE LANGUAGE MODELS

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate an NL based output that is responsive to the NL based input and that is to be rendered at the client device.

In some cases, an LLM can include millions of parameters, hundreds of millions of parameters, billions of parameters, or even one hundred billion or more parameters. As such, given the large numbers of parameters included in an LLM, performance of NLP tasks using an LLM can consume relatively large amounts of resources (e.g., in terms of computing resources used in completing the NLP task, time taken to complete performance of the NLP task, energy consumed to complete performance of the NLP task, etc.). Furthermore, again owing to the size of LLMs, it can be difficult to adequately train an LLM such that it can reliably perform a given NLP task according to that task's respective constraints. It is therefore beneficial in terms of computational resource usage for LLMs to generate responses to NL based inputs that do not necessitate additional follow-up NL based inputs.

SUMMARY

Implementations described herein can serve to reduce the number of follow-up NL based inputs that may be received by an LLM. Although any given user may decide to provide a follow-up NL based input, any "on average" reduction in the number of follow-up NL based inputs can be hugely beneficial in terms of computational resource usage.

More specifically, some implementations described herein relate to utilizing an LLM to generate a sequence of responses to an NL based input in a single inference call. Since each of the responses is generated at least in part based on the preceding response (e.g., by virtue of an attention mechanism or other memory employed by the LLM), it can be assumed that each subsequent response is an improvement on the preceding response. Some of these implementations described herein relate to using the described techniques at inference time, to provide an improved response to a user that is responsive to the user's NL based input (e.g., such that a likelihood of the user providing a follow-up NL based input after receiving the improved response is reduced). Some additional or alternative implementations described herein relate to using the described techniques to generate training data by storing the NL based input along with an improved response that is responsive to the NL based input as an instance of training data. This training data can be used to fine-tune an LLM, (e.g., such that responses generated using the fine-tuned LLM can be less likely to result in follow-up NL based inputs).

Some implementations described herein include an LLM being used to process an NL based input to generate a sequence of responses, including at least one intermediate response and a final response, in a single decoding step (or in other words, in a single inference call to the LLM). The LLM can generate the sequence of responses in a single decoding step based on being provided with an LLM input that includes the NL based input. The LLM input can also include, for example, requests to generate the at least one intermediate response and a request to generate the final response. For instance, the LLM input can be formatted according to a template that is not provided by the user that provided the NL based input, and can be provided to the LLM along with the NL based input even without the user's knowledge. The template can include, for example, a space or entry field after each of the requests to prompt the LLM to fill the space or entry field with output that is responsive to the respective requests. Each of the responses can then be generated, in turn, using the LLM, by taking into account the preceding responses (e.g., via an attention mechanism or other memory employed by the LLM). In this way, each subsequent response can be improved, or refined, relative to the preceding response. It is to be noted that, in some cases, it can be determined that further improvement of a response is not necessary. For instance, if the appropriate response to an NL based input is either "yes" or "no", or if it is determined that a particular response (e.g., prior to the final response) is correct, then no improvement in the subsequent responses is required. In some of these cases, each subsequent response can simply be a repetition of the "correct" response. In other of these cases, the LLM can halt further processing of the NL based input and/or the LLM input to conserve computational resources.

In some implementations, one or more critique responses can be generated using the LLM. For instance, the template can additionally include a request for the generation of a critique response. Each critique response can be generated for a corresponding one of the intermediate responses, and can include, for instance, a critique of the corresponding one of the intermediate responses. For instance, a request for the critique response can include a request for an analysis of the respective intermediate response to be provided, and/or for areas of improvement for the respective intermediate response to be identified.

The number and/or content of the requests for critique responses can be tailored based on the particular context (e.g., token length allocated to critique responses, the NL based input, information associated with a user, and/or other context data such as the application used to enter the NL based input, metadata of a database from which the NL based input was retrieved from, etc). For instance, for relatively straightforward tasks, it may be determined that there is no need for the inclusion of critique responses. In other tasks, one, two, or more critique responses can be generated for each of the intermediate responses. In addition, for some tasks and/or contexts, it can be determined that the request for the critique response be relatively open ended (e.g., a request for areas of improvement for the respective intermediate response to be identified). For other tasks and/or contexts, a more guided request can be used (e.g., a request for the factuality for the respective intermediate response to be determined). Each of the responses can then be generated, in turn, using the LLM, by taking into account, at least, the preceding response and the corresponding critique response (e.g., by virtue of an attention mechanism or other memory employed by the LLM). In this way, each subsequent response can be improved, or refined, relative to the preceding response. Since more information (e.g., the critique response(s)) is available to the LLM when generating the subsequent responses, the improvement can be greater for each subsequent response.

Notably, the number of intermediate responses can also be tailored in a similar manner as described in relation to the critique responses. In some implementations, the tailoring of the critique responses and/or the intermediate responses can be performed by a user. In some additional or alternative implementations, the tailoring can be performed automatically by one or more models (e.g., the LLM and/or another machine learning (ML) model).

Three non-limiting examples of templates which could be used to generate an LLM input are provided below:

Example Template 1

```
Prompt: <>
{
  "response 1":
  "improved response iteration 1":
  "improved response iteration 2":
  "improved response iteration 3":
  "final response":
}
```

Example Template 2

```
Prompt: <>
{
"response 1":
"area for improvement in response 1":
"improved response iteration 1":
"area for improvement for improved response iteration 1":
"improved response iteration 2":
"area for improvement for improved response iteration 2":
"improved response iteration 3":
"area for improvement for improved response iteration 3":
"final response":
}
```

Example Template 3

```
Prompt: <>
{
"response 1":
"analysis of response 1":
"area for improvement for response 1":
"improved response iteration 1":
"analysis of improved response iteration 1":
"area for improvement for improved response iteration 1":
"improved response iteration 2":
"analysis of improved response iteration 2":
"area for improvement for improved response iteration 2":
"improved response iteration 3":
"analysis of improved response iteration 3":
"area for improvement for improved response iteration 3":
"final response":
}
```

As illustrated in these examples, the requests to generate intermediate answers can include, for instance, the text "response X:" and/or "improved response iteration X:" (e.g., where X is a positive integer that sequentially increases with each iteration), the request to generate the final response can include the text "final response:", and the requests to generate critique responses can include the text "analysis . . . :" and/or "area for improvement . . . :". In some implementations, a high-level request can also be included to guide the LLM to provide appropriate responses. For instance, in the case of Example template 1, a high-level request can include the text "generate a response to a prompt first and keep on updating it until the final response is generated". In the case of Example template 2, a high-level request can include the text "generate a response to a prompt first, find areas for improvement and keep on updating it until the final response is generated". In the case of Example template 3, a high-level request can include the text "generate a response to a prompt first, analyze it, find areas for improvement and keep on updating until the final response is generated". In addition, it can be assumed that the LLM input be generated such that the NL based input is provided as the argument for "Prompt: < >" in the LLM input. The output of the LLM can be, for instance, formatted as the template with each of the spaces (or entry fields) having been filled in, a table representing the same information, etc.

Whilst some examples of LLM inputs have been discussed, it will be appreciated that the techniques described herein are not restricted to these examples. For instance, in some implementations the requests for the intermediate responses can each be the same, and/or the request for the final response can be the same as some or all of the requests for the intermediate responses. In addition, as described herein, the LLM input can be tailored according to the NL based input and/or other contextual information such as the task to be completed. For instance, an NL based input may relate to completing a task by an automated assistant, such as booking a flight. In this case, each response can include, for instance, flight numbers, starting and/or arrival airports, connections, time of flight, seat position, class, price information, etc. Each subsequent response can thus include an improvement over the preceding response in one or more of these aspects (e.g., reducing price, reducing total travel time, reducing number of connections, using the user's preferred class or seat position, etc). The requests for the critique responses (if included) of these responses can thus guide the improvement of the responses (and/or a particular aspect) to a greater or lesser extent.

As another example, the NL based input can relate to a search for factual information. The improvements to the responses can thus relate to improving the factuality of the response. The requests for the critique responses (if included) can thus relate to determining whether the responses are factually accurate. For instance, the NL based input can include a query of "Who is the 44th president of the United States". In response, an intermediate response can be generated including the answer "Barack Obama". Assuming this is factually accurate, a corresponding critique response (if included) can include an indication that this answer is factually accurate. As such, each of the subsequent responses can simply repeat this answer (e.g., since further improvement is not required). In the event that the answer was found to not be factually accurate, the subsequent responses can be improved by including a more factually accurate answer. As another example, the NL based input can include a more open-ended search of information, such as "Who is Barack Obama". In this case, the responses can be improved by not only improving the factuality of the responses, but additionally or alternatively by, for instance, reducing bias, providing more information, providing more relevant information, etc. In some implementations, the responses can be improved by use of an external entity (e.g., an agent, a plugin, a skill, etc.). For instance, the NL based input can include a mathematical operation. The responses can thus be improved by ensuring that the mathematical operation has been accurately executed in the responses (via critique responses generated using a mathematical agent or plugin).

Although a number of task types have been discussed herein, it will be appreciated that the techniques described herein are not limited to these particular task types, and, in fact, the techniques described herein can be used with any suitable task types. For instance, the NL based input can relate to a task to generate code or instructions for an apparatus (e.g., such as a robot). The responses can thus be improved by, for instance, ensuring that the responses reflect the functionality of the NL based input, improving the efficiency of the code and/or instructions in the responses, improving the style of the code and/or instructions in the responses, ensuring the code and/or instructions in the response are provided in a particular language (e.g., according to the NL based input, user preferences, etc), reducing the number of lines of code and/or instructions in the response, etc. As another example, the task can relate to a task which can be completed by multiple agents or plugins. The responses can thus be improved by, for instance, increasing the number of agents or plugins by which the task is completed by, etc.

In some implementations, the techniques described herein can be used during inference time by an NL based response system that can access an LLM to generate a response to an NL based input associated with (e.g., provided by) a user via a client device. In some implementations, only the final response can be rendered to the user (e.g., by bypassing rendering of the intermediate responses and the critique responses). In this way, resources which would otherwise be consumed in transmitting and rendering the intermediate responses (and critique responses) can be conserved. In some other implementations, one or more of the intermediate responses can be displayed to the user. For instance, the intermediate responses can be rendered, in turn (e.g., as a list, as a sequence with each subsequent response replacing the preceding response, etc), to provide information to the user regarding how the responses have been improved. Additionally, or alternatively, the critique responses (if included) can be displayed to the user to provide additional information to the user regarding why an improvement in a given response has been made.

In some additional or alternative implementations, the final response can be stored, along with the NL based input provided by the user, as an instance of training data. The instance of training data can also include one or more of the intermediate responses and/or one or more critique responses (if included), as well as any other contextual information (such as the type of task being completed). The instance of training data can be stored in a database storing a plurality of other instances of training data based on historical NL based inputs provided by the user and/or by other users. The LLM or an additional LLM can be subsequently fine-tuned based on the instance of training data and/or the plurality of other instances of training data.

In some implementations, the techniques described herein can be used to generate synthetic training data for fine-tuning an LLM for subsequent utilization by, for example, an NL based response system. For instance, an NL based input can be obtained (for instance, from a database of previously submitted NL based inputs provided by one or more users), and be processed to generate an LLM input (e.g., based on a template). A "high-quality" response (e.g., the final response) to the NL based input can be generated based on processing the LLM input using the LLM. The NL based input and the high-quality response can then be stored as a training instance to be used for fine-tuning the LLM. In some implementations, the instance of training data can also include one or more of the intermediate responses and/or one or more critique responses (if included), as well as any other contextual information (such as the type of task being completed). For instance, an intermediate response can be stored as an example of a "low quality" response, and the fine-tuning can be based on both the high-quality response (e.g., a positive instance of training data) and the low-quality response (e.g., a negative instance of training data).

In some versions of those implementations, the NL based inputs can be "hard" NL based inputs (e.g., from the database of previously submitted NL based inputs provided by one or more users). In this context, a "hard" NL based input can be defined as an NL based input for which the LLM (e.g., prior to fine-tuning) provided a low-quality response (e.g., such as a response which resulted in a "follow-up" input from the user, a response which has been evaluated by a user as being low quality by providing a negative feedback such as a low score or a "thumbs down", etc). Since, in general, the performance of an LLM (e.g., the LLM's ability to generate a high-quality response responsive to a wide variety of NL based inputs) can be expected to improve by being fine-tuned (or trained) based on "hard" NL based inputs, it is beneficial to identify and provide "hard" NL based inputs along with corresponding high-quality examples of responses to those inputs. As such, once the "hard" NL based inputs have been identified, implementations described herein can be used to generate training data based on the identified NL based inputs. Once the training instance(s) have been generated in this manner, the LLM (or a different LLM), can be fine-tuned (or otherwise termed, trained) using at least these training instances. This can be performed in any suitable way (e.g., supervised learning, reinforcement learning, etc).

By fine-tuning the LLM based on examples of high-quality responses, the average quality of responses generated using the fine-tuned LLM can be of a higher quality than corresponding responses generated using the LLM prior to fine-tuning. This process can be repeated, such that at each iteration, the average quality of response generated using the LLM is improved.

In these and other manners, responses generated using an LLM can be reliably of a higher quality. This can be the case whether the techniques described herein are used when the response is generated, are used to generate training data used in fine-tuning the LLM prior to the response being generated, or both. As such, instances of subsequent (e.g., follow-up) NL based inputs provided by a user, e.g. in order to improve the quality of an initial response, which would otherwise be processed by the LLM can be reduced. For instance, it can be assumed that the quality of certain aspects of a given response (e.g., factuality, etc.) to a corresponding NL based input can be associated with a likelihood of the given response resulting in follow-up NL based inputs. It can be assumed that the improvements at each subsequent response improve or correct one or more of these aspects of the responses, as described herein. As such, by generating a sequence of progressively improved responses, and selecting the final (e.g., highest quality) response, the number of follow-up NL based inputs can be reduced. In other words, the final response can be considered to be of a high-quality given that it can be assumed that it has a low likelihood of resulting in follow-up NL based inputs. For instance, if an initial response to an initial NL based input is not of a sufficiently high-quality (e.g., because one or more aspects of the response are not satisfactory), the user may provide a further NL based input which explicitly requests that the response be improved (e.g., by referring to a particular unsatisfactory aspect of the initial response) in an effort to force the LLM to generate a response which is of a higher quality. The user may repeat this process a number of times, for instance, if one or more aspects of the subsequent responses are not of a satisfactory quality. The techniques described herein can ensure that resources, which would otherwise be consumed in these repeated interactions with the LLM, can be conserved.

Furthermore, by generating the sequence of responses with a single inference call, the number of inference calls to generate a high-quality response can be reduced (e.g., compared to iteratively improving responses over a plurality of inference calls). As such, resources consumed in generating a high-quality response can be reduced. In addition, latency in providing a high-quality response to a user in response to the user's NL based input can be reduced. In fact, as compared to techniques which involve multiple inference calls to generate a high-quality response, latency can be reduced to such a degree that the techniques described herein can be used in providing high-quality responses at inference time to users, whilst maintaining an acceptable user experience.

In addition, as compared to, for instance, techniques which iteratively refine responses over many inference calls, whereby each inference call is, in effect, an independent inference call, the techniques described herein result in the LLM having access to all of the available information (e.g., the preceding responses and/or critique responses) when generating each subsequent response. In this way, the techniques described herein can produce relatively higher quality results.

In addition, in some instances, the techniques described herein can be used as part of an NL based response system to be used for conducting a dialog (e.g., including multiple inputs and responses) with a human user. For instance, the NL based response system can be provided as part of an automated assistant, a chat bot, etc. In some cases, the user can provide one or more commands to be fulfilled as part of the dialog (e.g., to control a smart device, to generate code, to generate commands to control a robot, to assist with navigation in a vehicle, etc.). As such, use of the techniques described herein can also assist the user in performing a technical task by means of a continued and guided human-machine interaction process. Further, and since the responses generated using the LLM can be reliably of a higher quality, the human-machine interaction process can be concluded in a quick and efficient manner.

Furthermore, implementations described herein can allow a user to more easily and intuitively interact and control the NL based response system, which is itself a technical system. For instance, since the NL based response system can be capable of refining responses itself, it is not necessary for the user to explicitly provide further NL based inputs to perform these processes. As discussed herein, determining the content of such further NL based inputs by a human can require trial and error, or can require high levels of skill, training, and/or familiarity with the particular LLM. As such, implementations described herein can mitigate these obstacles.

In other words, implementations described herein can provide a mechanism by which, without any additional interaction from the user, the additional information (e.g., intermediate responses and/or critique responses) can effectively be leveraged when processing the NL based input by the LLM to generate a high-quality response, and therefore provide more efficient access to the information stored in the LLM. This has the effect of augmenting the NL based input (e.g., using the structured requests described herein to conduct the described processes) to the LLM, and thus improving the information retrieval by the LLM on an objective basis.

As mentioned, an LLM is typically trained with data from, for instance, webpages, electronic books, software code, electronic news articles, and machine translation data, and, when, for instance, generating a response to a particular NL based input, the LLM leverages the underlying data on which it was trained. In this way, an LLM can be considered to be a database structure with information stored in the parameters of the LLM. Since, as described herein, an NL based input to be processed by the LLM can be augmented by using the processes described herein, this can be considered to be an improved database query, which can result in more efficient information retrieval.

The above description is provided as an overview of some implementations of the present disclosure. Further description of those implementations, and other implementations, are described in more detail below.

DETAILED DESCRIPTION OF THE DRAWINGS

Figure 1:
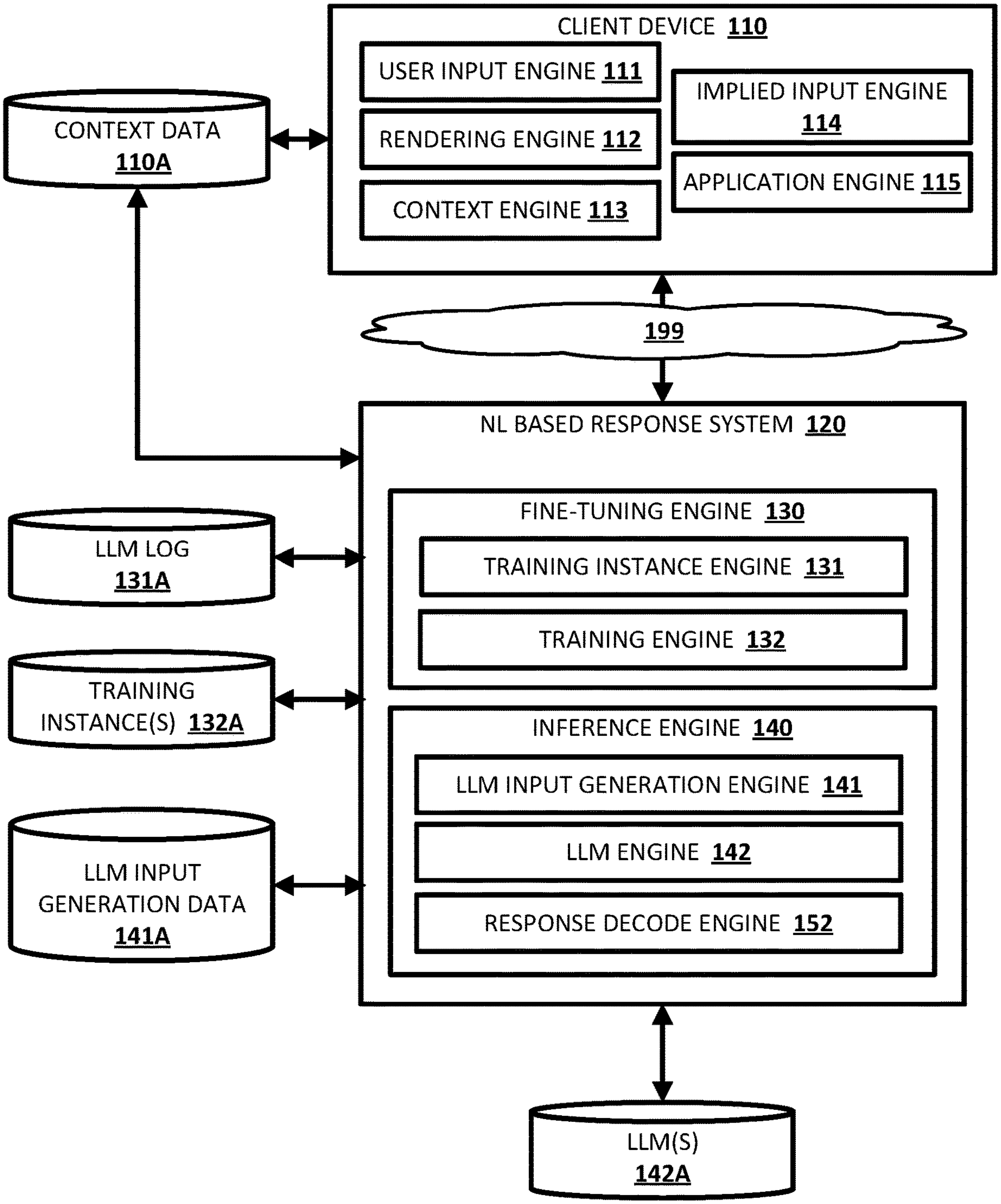
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which some implementations disclosed herein can be implemented, is depicted. The example environment includes a client device 110 and an NL based response system 120.

In some implementations, all or some aspects of the NL based response system 120 can be implemented locally at the client device 110. In additional or alternative implementations, all or some aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the NL based response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more other input components (e.g., a keyboard and mouse, a stylus, a touch screen, a touch panel, one or more hardware buttons, etc.) that are configured to capture signal(s) corresponding to touch or typed input directed to the client device 110.

Some instances of an NL based input described herein can be a query for an NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of an NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render content (e.g., NL based response(s)) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, the context engine 113 can determine a context based on data stored in context data database 110A. The data stored in the context data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the context data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "best landmarks to visit in London" based on a recently issued query, profile data, and/or a current or an anticipated future location of the client device 110 (e.g., based on calendar information associated with the user accessible to the context engine 113). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of response(s) for the implied NL based input, optionally independent of any explicit NL based input that requests rendering of the response(s). For example, the implied input engine 114 can use one or more past or current contexts, from the context engine 113, in generating an implied NL based input, determining to submit the implied NL based input, and/or in determining to cause rendering of response(s) that is responsive to the implied NL based input. For instance, the implied input engine 114 can automatically generate and automatically submit an implied query or implied prompt based on the one or more past or current contexts. Further, the implied input engine 114 can automatically push the response(s) that is generated responsive to the implied query or implied prompt to cause them to be automatically rendered or can automatically push a notification of the response(s), such as a selectable notification that, when selected, causes rendering of the response(s). Additionally, or alternatively, the implied input engine 114 can submit respective implied NL based input at regular or non-regular intervals, and cause respective response(s) to be automatically provided (or a notification thereof automatically provided). For instance, the implied NL based input can be "automated assistant news" based on the one or more past or current contexts indicating a user's general interest in automated assistants, the implied NL based input or a variation thereof periodically submitted, and the respective response(s) can be automatically provided (or a notification thereof automatically provided). It is noted that the respective response(s) can vary over time in view of, e.g., presence of new/fresh search result document(s) over time.

Further, the client device 110 and/or the NL based response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices can be in communication with the client device 110 (e.g., over the network(s) 199). As another example, a given client device can be utilized by multiple users in a shared setting (e.g., a group of users, a household, a workplace, a hotel, etc.).

The NL based response system 120 is illustrated in FIG. 1 as including a fine-tuning engine 130, and an inference engine 140. Some of these engines can be combined and/or omitted in various implementations. Further, these engines can include various sub-engines. For instance, the fine-tuning engine 130 is illustrated in FIG. 1 as including a training instance engine 131 and a training engine 132. Also, for instance, the inference engine 140 is illustrated in FIG. 1 as including an LLM input generation engine 141, an LLM engine 142, and a response decode engine 143. Similarly, the sub-engines can be combined and/or omitted in various implementations. Accordingly, it should be understood that the various engines and sub-engines of the NL based response system 120 illustrated in FIG. 1 are depicted for the sake of describing certain functionalities and is not meant to be limiting.

Further, the NL based response system 120 is illustrated in FIG. 1 as interfacing with various databases, such as the context data database 110A, LLM log database 131A, training instance(s) database 132A, LLM input generation data database 141A, and LLM(s) database 142A. Although particular engines and/or sub-engines are depicted as having access to particular databases, it should be understood that this is for the sake of example and is not meant to be limiting. For instance, in some implementations, each of the various engines and/or sub-engines of the NL based response system 120 can have access to each of the various databases. Further, some of these databases can be combined and/or omitted in various implementations. Accordingly, it should be understood that the various databases interfacing with the NL based response system 120 illustrated in FIG. 1 are depicted for the sake of describing certain data that is accessible to the NL based response system 120 and is not meant to be limiting.

As described in more detail herein (e.g., with respect to FIGS. 2A-2C, 3A-3B, 4, 5, and 6), the NL based response system 120 can be utilized to generate responsive output to NL based input. For instance, an NL based input (or LLM input generated based on the NL based input, e.g., using LLM input generation engine 141) can be processed by the LLM engine 142, using an LLM stored in the LLM(s) database 142A, to generate LLM output. The LLM output can be processed (e.g., using response decode engine 143) to determine a sequence of responses including at least one intermediate response and a final response. In some implementations, the LLM output can also include one or more critique responses corresponding to the intermediate response(s). The critique responses can be indicative of an extent to which the corresponding intermediate response complies with one or more particular criteria.

The intermediate response generation, the final response generation and/or the critique response generation can be initiated in a single inference call, based on processing, with the LLM, a corresponding request embodied by the LLM input (e.g., generated by LLM input generation engine 141, and using LLM input generation data stored in the LLM input generation data database 141A and optionally using context data stored in the context data database 110A) or the NL based input.

Figure 2A:
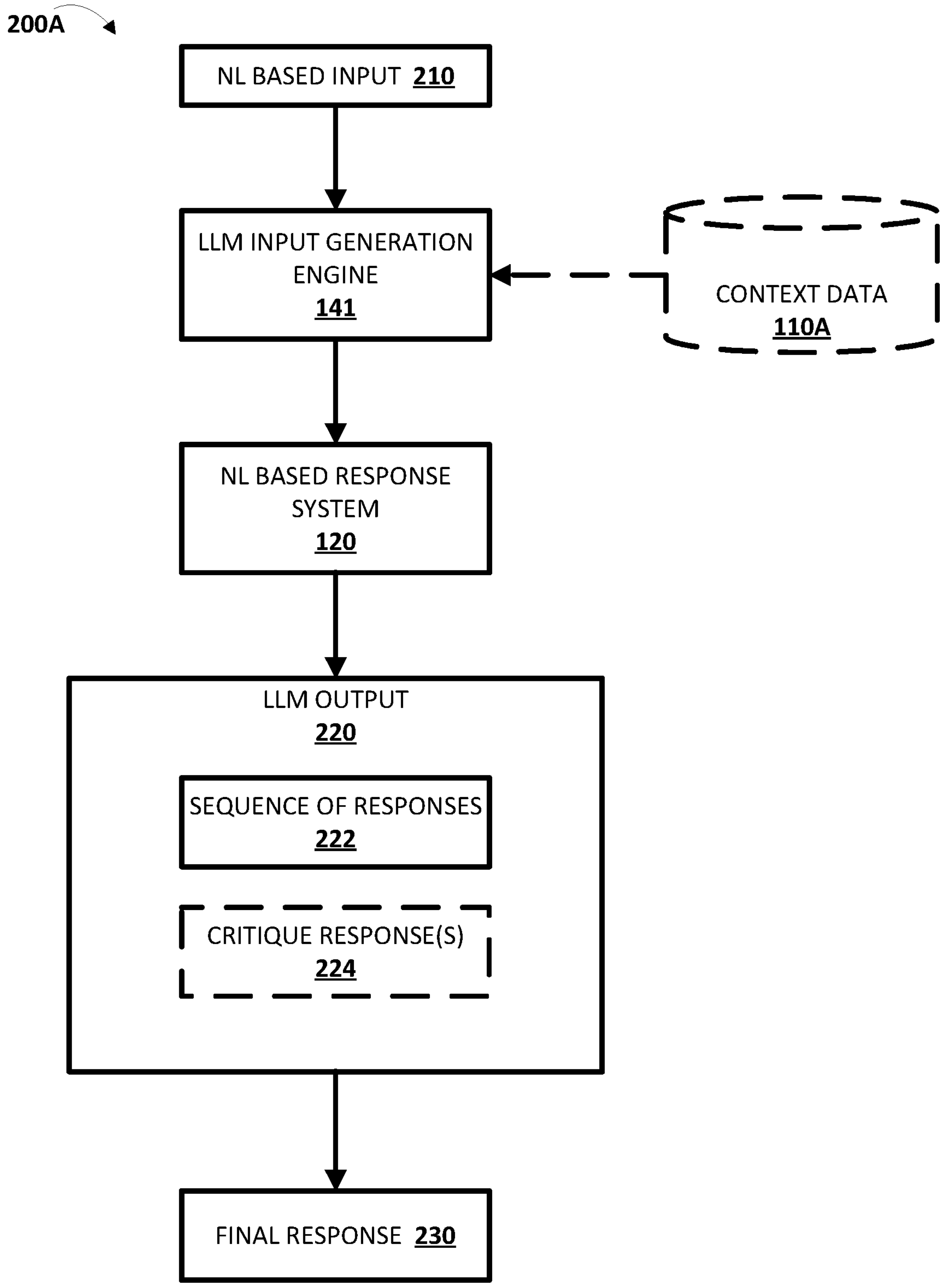
FIG. 2A depicts an example process flow for generating a response to an NL based input generated using an NL based response system, in accordance with various implementations.
Figure 2B:
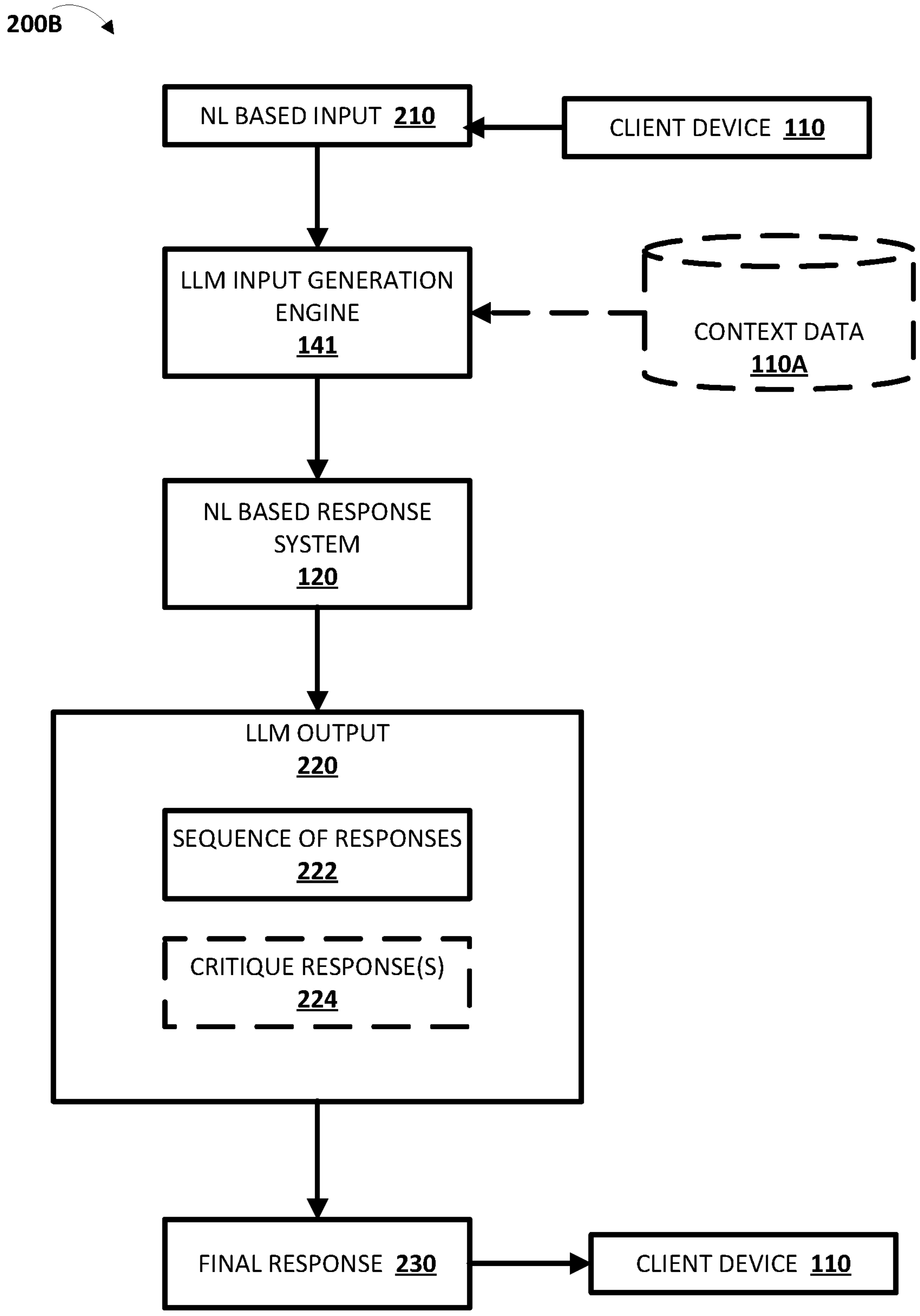
FIG. 2B depicts an example process flow for generating and causing display of a response to an NL based input associated with a client device generated using an NL based response system, in accordance with various implementations.
Figure 5:
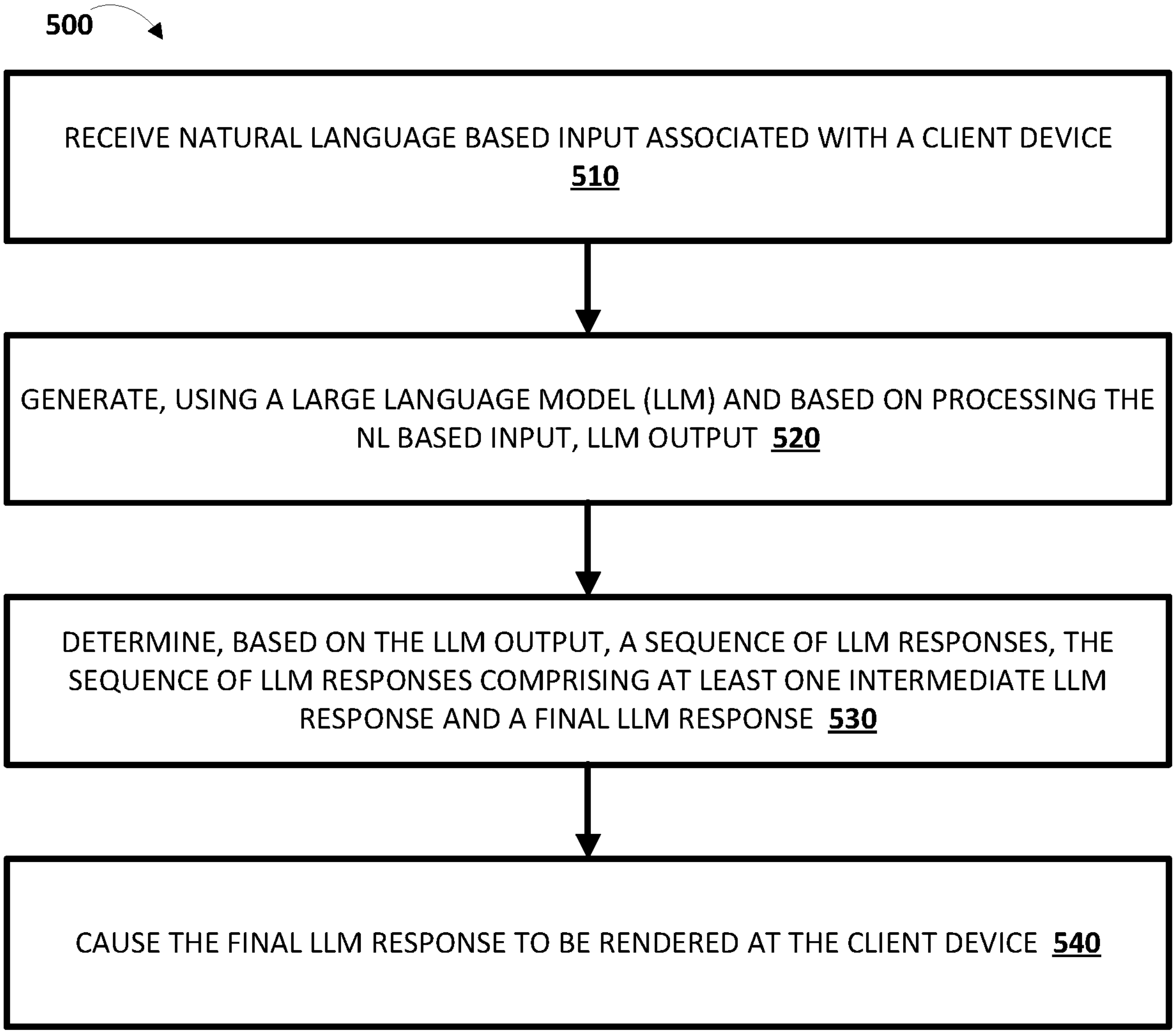
FIG. 5 depicts a flowchart illustrating an example method of utilizing an NL based response system to generate a response to an NL based input associated with a client device, in accordance with various implementations.

In some implementations, the NL based input to be processed by the NL based response system 120 can be associated with a client device 110 (for instance, provided by a user of the client device 110 via user input engine 111, implied input engine 114, etc.), and the NL based response system 120 can be used to generate a particular response to be rendered (e.g., using rendering engine 112) at the client device 110 (e.g. as described with respect to FIGS. 2B and 5).

In additional or alternative implementations, the NL based input can be obtained from historical NL based input data stored in the LLM log database 131A. In some of these implementations, the NL based response system 120 can be used to generate training instances, including at least the NL based input and a final response (e.g., as described with respect to FIGS. 2C and 6). The training instances can be stored in the training instance(s) database 132A, for instance, using training instance engine 131. The training instance(s) database 132A can include training instances generated as described herein (e.g., in relation to FIG. 2C), and optionally further obtained in any other way. An LLM stored in the LLM(s) database 142A can be fine-tuned using the training engine 132 based on the training instances stored in the training instance(s) database 132A (e.g., as described with respect to FIG. 4). Additional description of the various engines and/or sub-engines of the NL based response system 120 is provided herein with respect to FIGS. 2A-2C, 3A-3C, 5, and 6.

Turning now to FIG. 2A, an example process flow 200A for generating a response to an NL based input generated using an NL based response system (e.g., the NL based response system 120 of FIG. 1) is depicted. As discussed herein, an NL based input 210 can be obtained. The NL based input 210 can be provided to the NL based response system 120 in order to obtain output responsive to the NL based input 210. For instance, the NL based input 210 can include a query or a prompt. In some implementations, the NL based input 210 can include an intent to complete a particular task, for instance, to be fulfilled by an automated assistant that is communicatively coupled to the NL based response system (e.g., via the network(s) 199).

In some implementations, the NL based input 210 can be processed to generate LLM input (e.g., using the LLM input generation engine 141). For instance, the LLM input can be generated based on modifying a template (e.g., retrieved from LLM input generation data database 141A) to include the NL based input 210. The template can further include a plurality of requests to direct the LLM to generate, for instance, intermediate responses, a final response, one or more critique responses corresponding to the intermediate responses, etc.

In some implementations, the LLM input can be generated based on further modifying the template (e.g., based on other LLM input generation data from the LLM input generation data database 141A and/or context data from context data database 110A). For instance, the number of requests to generate intermediate responses can be modified (e.g., to tailor the number of intermediate responses present in the LLM output). Additionally, or alternatively, the number and/or content of the requests to generate the critique responses can be modified (e.g., to tailor the number of critique responses present in the LLM output and/or the extent to which the critique responses guide the LLM in generating subsequent intermediate/final responses). The modification can be performed, for instance, automatically using the LLM input generation engine 141. In some other implementations, the modification can be performed manually. In some implementations, the further modification can be performed after the NL based input 210 has been obtained. In some other implementations, the further modification can be performed prior to the NL based input 210 being obtained.

The context data database 110A can include, for instance, information related to the user, a user account associated with the user, user preferences, the client device 110, applications executing on the client device 110 (e.g., including the application which received the NL based input 210), a location, a time of day, a date, a calendar entry, a type of task associated with the NL based input, etc. For instance, if it is determined, based on the context data that a user is in a location with limited bandwidth, a user has calendar events planned in the near future, and/or a user has previously set user preferences indicating that speed of response be prioritized by the NL based response system 120, the LLM input can be modified to generate a relatively lower number of intermediate responses (e.g., less than N intermediate responses, where N is a positive integer) and/or critique responses (e.g., zero critique responses). On the other hand, if it is determined that a user does not have imminently occurring calendar events, the application receiving the NL based input 210 and/or task associated with the NL based input 210 requires a highly accurate response, and/or a user has previously set user preferences prioritising accuracy, the LLM input can be modified to generate a relatively higher number of intermediate responses (e.g., N or more intermediate responses, where N is the positive integer) and/or critique responses (e.g., one or more critique responses for each intermediate response).

Although it is generally described that the NL based input 210 be processed to generate the LLM input, it should be understood that in other implementations, this is not necessary. For instance, in some implementations, the NL based input 210 can be provided in a form that does not require further processing before being processed using an LLM (e.g., based on user input, from an application executing on the client device 110, etc).

As described herein, LLM output 220 can be generated based on processing the LLM input (or, the NL based input 210 as the case may be), by the NL based response system 120. The LLM output can be indicative of a sequence of responses 222 including at least one intermediate response and a final response 230, and in some implementations, one or more critique responses 224 corresponding to the intermediate responses 222. The sequence of responses can be generated, in turn, using an LLM (e.g., from LLM(s) database 142A using LLM engine 142), by taking into account at least the immediately preceding response (e.g., via an attention mechanism or other memory employed by the LLM), and optionally the critique response(s) corresponding to the immediately preceding response. In some implementations, the LLM can take into account more than the immediately preceding response (e.g., all of the preceding intermediate responses, the corresponding critique responses to each of the preceding intermediate responses, etc), when generating each subsequent response in the sequence or responses 222. Since the LLM output is generated based on a single inference call to the LLM, each of the responses (and critique responses 224), including the final response 230 can be available simultaneously. The final response 230 can thus be provided as output of the example process flow 200A.

Turning now to FIG. 2B, an example process flow 200B for generating and causing display of a response to an NL based input associated with a client device generated using an NL based response system is depicted. The example process flow 200B of FIG. 2B is largely the same as the example process flow 200A described in relation to FIG. 2A. However, as shown in FIG. 2B, the NL based input 210 can be associated with a client device 110. Furthermore, the final response 230 (e.g., generated according to example process flow 200A of FIG. 2A) can be provided for rendering at the client device 110.

For instance, the NL based input 210 can be provided based on user input by a user of the client device 110. The user can provide the user input, for instance, by typing on a virtual or physical keyboard of the client device 110, providing speech which is captured by one or more microphones of the client device 110, selection (e.g., via tapping on a touch screen display, voice command, using a pointing device, etc.) of a suggested input, providing gestures captured by one or more sensors of the client device 110, etc. Information indicative of the user input can be used to determine the NL based input 210, and ultimately, in some implementations, the LLM input. For instance, the information can include text entered, selected, or determined based on processing the user's speech using speech recognition. This text can then be provided as the NL based input 210. As another example the information can include one or more token(s) which can be used to determine the NL based input 210 (e.g., by the client device 110 or the NL based response system 120). The information can be provided to the NL based response system 120 by the client device 110, for instance, via a wireless network (such as the network(s) 199). The LLM input can then be generated, for instance using the LLM input generation engine 141, based on the NL based input 210 (e.g., as described above in relation to FIG. 2A).

Similarly, the final response 230 (or information indicative of the final response 230) can be provided to the client device 110 by the NL based response system 120 (e.g., via the network(s) 199). A command can also be sent to the client device 110 to cause the client device 110 to render the final response 230 (e.g., via a display of the client device 110, via a speaker of the client device 110, etc.). However, in some implementations, it can be assumed that the client device 110, upon receiving the final response 230, will render the final response 230, without any explicit command to do so being received. In some implementations, the final response 230 can also be stored along with the NL based input 210 (e.g., in the LLM Log database 131A), as well as optionally the intermediate responses and/or the critique responses, to be used as training data.

Although it has generally been described that the client device 110 to which the NL based input 210 is associated and the client device 110 which renders the final response 230 are the same client device 110, in some implementations, this may not be the case. In other words, the client device 110 which renders the final response 230 can be a different client device 110 than the client device 110 which provided the NL based input 210. For instance, the final response 230 can be rendered on a display separate from (but possibly associated with, for instance, by virtue of a user account being signed in on both devices) a smart speaker which received the NL based input 210.

In this way, the NL based response system 120 can be utilized to generate responses to NL based inputs 210 associated with a client device 110 and cause rendering of final responses 230 by the client device 110 (or an additional instance of the client device 110). In other words, the NL based response system 120 can be utilized to provide responses for a user. Put another way, the NL based response system 120 can be used during inference using the LLM. As such, resources required to process repeated interactions (e.g., follow-up NL based input(s), follow-up calls to the LLM, follow-up responses being generated and rendered, etc.) with the LLM (e.g., of the NL based response system 120) which could otherwise occur in order to refine an initial response can be conserved. In addition, expert knowledge and experience required to formulate an NL based input in order to retrieve a particular response can be reduced and/or eliminated altogether.

Figure 3A:
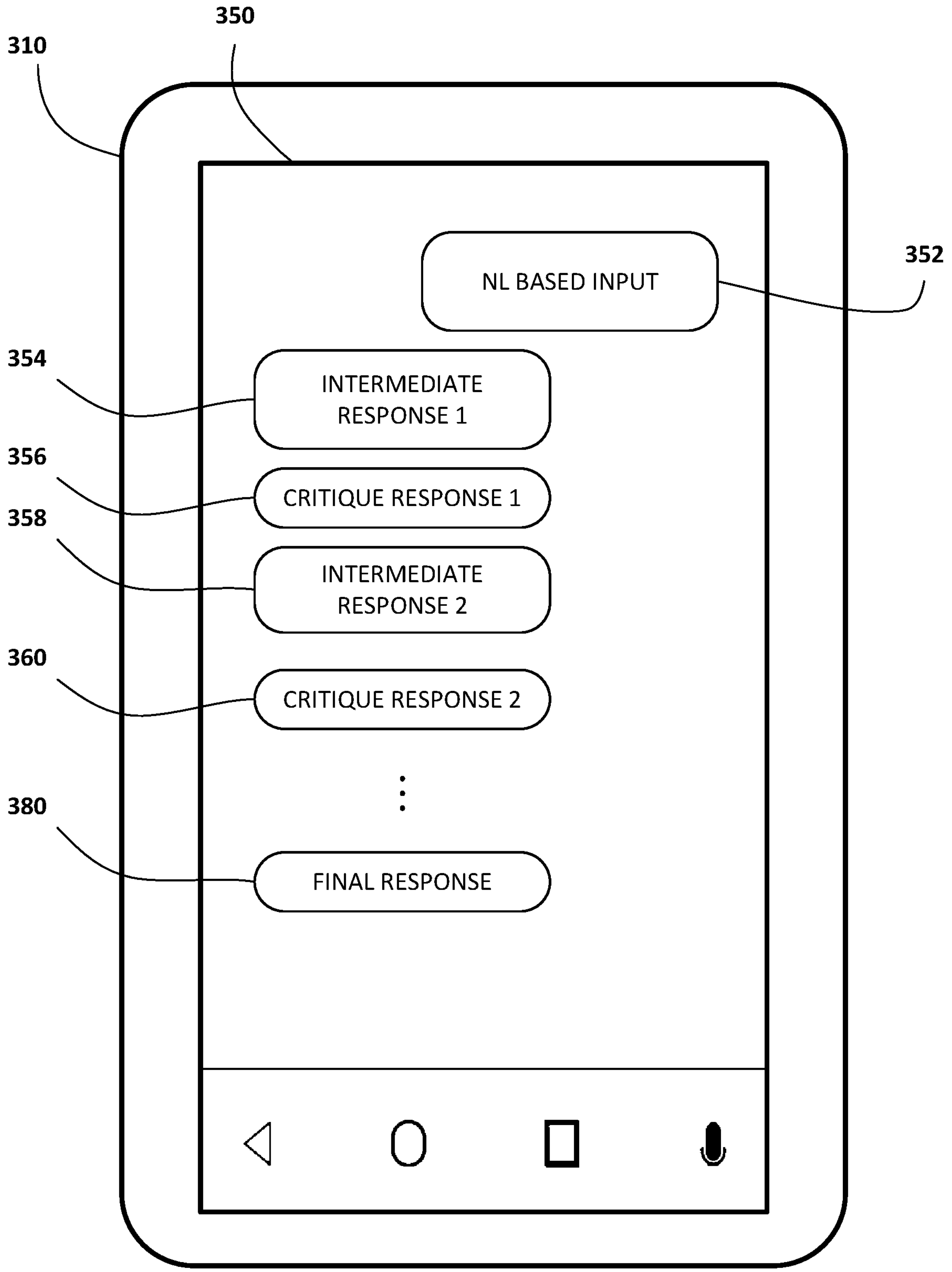
FIG. 3A, FIG. 3B and FIG. 3C depict example client devices rendering example graphical user interfaces including responses generated using an NL based response system.
Figure 3B:
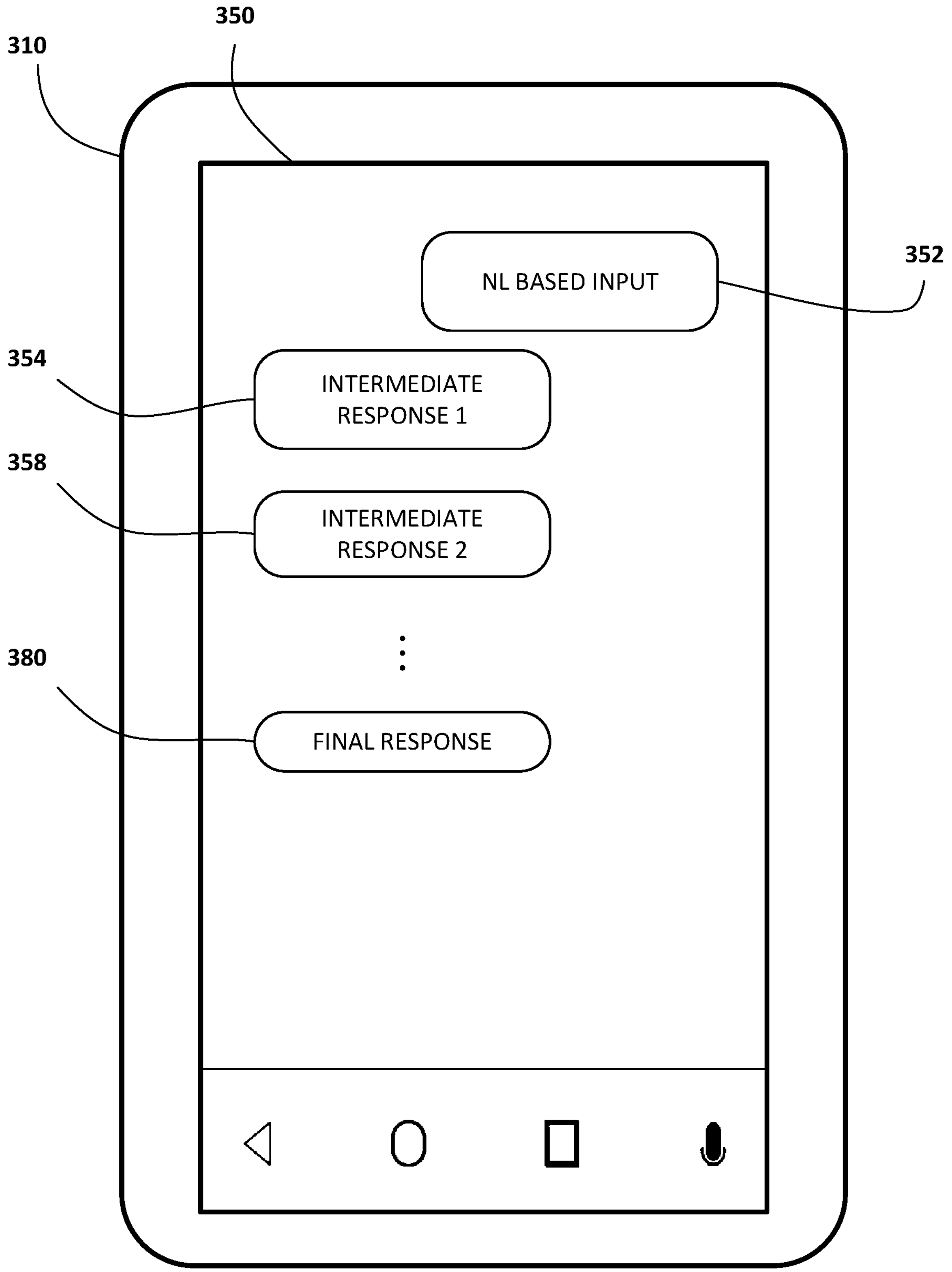
Figure 3C:
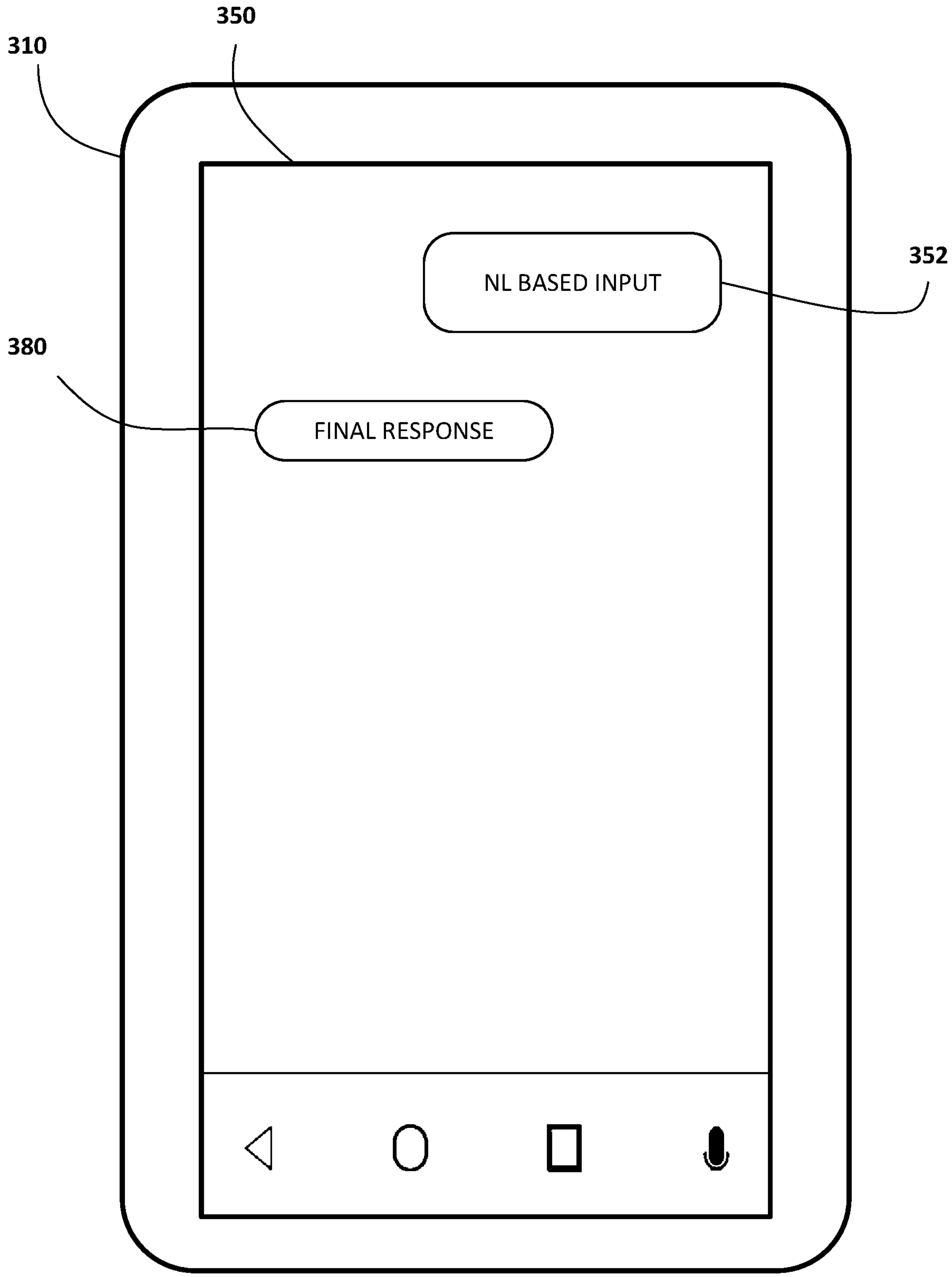

An example of the example process flow 200B is described herein in relation to FIGS. 3A to 3C. For example, and turning briefly to FIG. 3A, an example client device rendering an example graphical user interface including responses generated using an NL based response system is depicted.

The graphical interface includes an NL based input 352 associated with a client device 310 (e.g., an instance of the client device 110 from FIG. 1). For instance, a user of the client device 310 can provide the NL based input 352 (e.g., via touch or typed input received at a display 350 of the client device 310, via spoken input captured in audio data generated by one or more microphones of the client device 310, etc.).

The graphical interface also includes a plurality of intermediate responses 354, 358, a plurality of corresponding critique responses 356, 360, and a final response 380. As depicted in FIG. 3A, any number of intermediate responses 354, 358 and optionally critique responses 356, 360, can be generated and rendered (e.g., as indicated by the ellipses shown at the display 350 of the client device 310). Although FIG. 3A depicts critique response 356, 360 as being included in the graphical interface, it should be understood that this is for the sake of illustration and is not meant to be limiting. For instance, in some implementations, rather than the critique responses themselves being included, which may not be generated in a style or form appropriate for rendering to a user, reasoning information based on the critique responses can instead be rendered.

Referring briefly to FIG. 3B, the client device 310 with the display 350 is depicted now rendering a graphical interface that includes NL based input 352, intermediate responses 354, 358, and a final response 380. However, the graphical interface of FIG. 3B does not include any critique responses. This can be the case whether or not critique responses were generated by the NL based response system 120, or the critique responses are suppressed by the NL based response system 120. In this way, resources which would otherwise be consumed in generating, transmitting, and/or rendering the critique responses can be conserved.

Referring briefly to FIG. 3C, the client device 310 with the display 350 is depicted now rendering a graphical interface that includes NL based input 352, and a final response 380. However, the graphical interface of FIG. 3C does not include any critique responses or any intermediate responses (e.g., where the intermediate responses and the critique responses are suppressed by the NL based response system 120). In this way, resources which would otherwise be consumed in transmitting, and/or rendering the intermediate responses and the critique responses can be conserved.

Figure 2C:
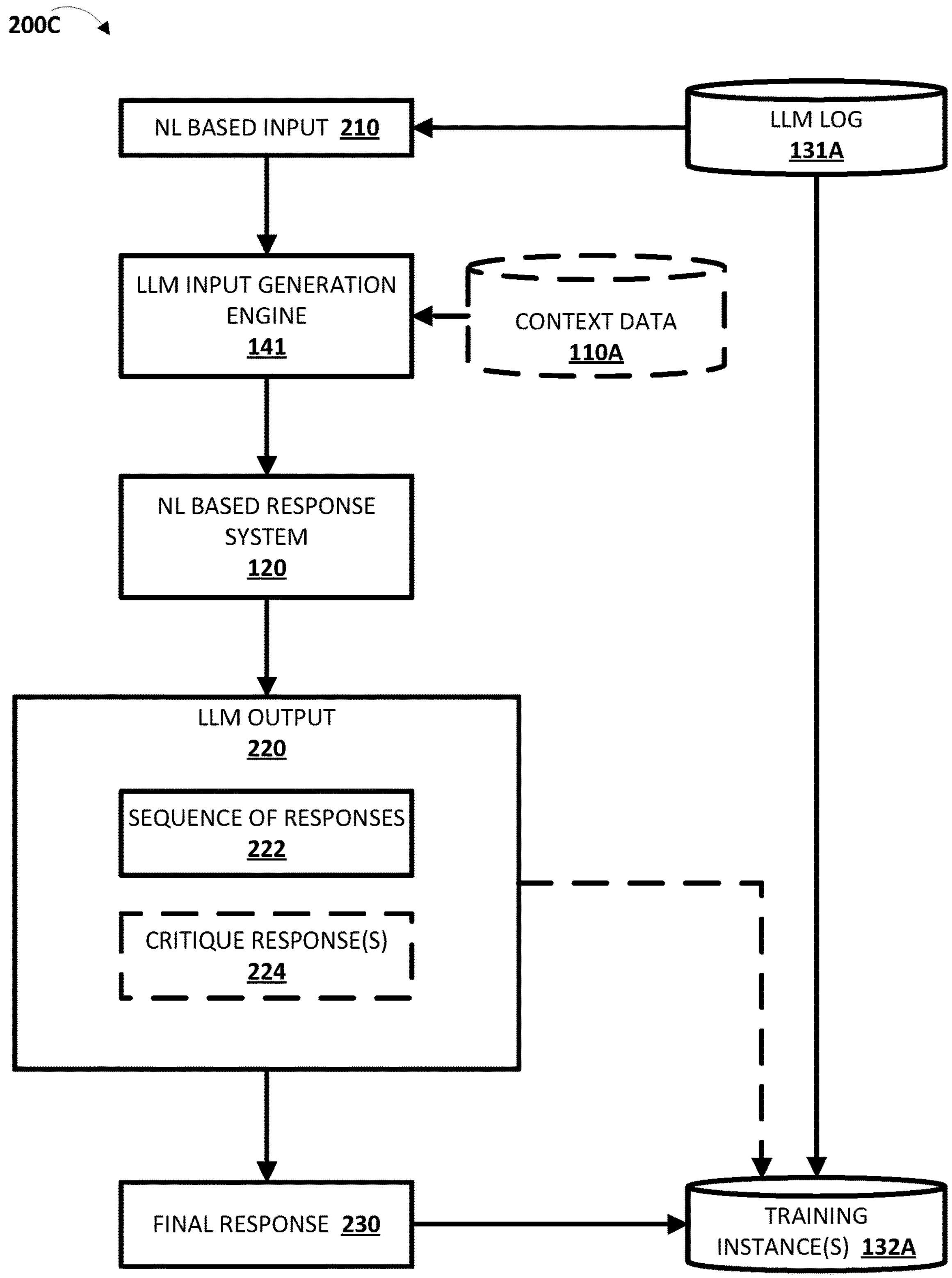
FIG. 2C depicts an example process flow for generating training instances by generating a response to an NL based input using an NL based response system, in accordance with various implementations.

Turning now back to FIG. 2C, an example process flow 200C for generating training instances by generating a response to an NL based input using an NL based response system is depicted. The example process flow 200C of FIG. 2C is largely the same as the example process flow 200A described in relation to FIG. 2A. However, as shown in FIG. 2C, the NL based input 210 can be obtained from an LLM log database 131A. Furthermore, the final response 230, the NL based input 210, and optionally the corresponding critique response can be stored in a training instance(s) database 132A. In this way, high-quality training data can be generated without the need for manual human generation or labelling. This can greatly reduce the resources required to obtain training data to fine-tune an LLM (e.g., of the NL based response system 120).

In some implementations, the LLM log database 131A can include a historical log of NL based inputs provided by one or more users as input to an LLM (e.g., an LLM stored in LLM database 131A), and optionally, a corresponding response generated in response to the NL based input.

In some implementations, the NL based input 210 can be identified from NL based inputs stored in LLM log database 131A and/or example input data database 151A. Identifying a particular NL based input can be based on one or more selection criteria. The selection criteria can be based on, for instance, the content of the NL based input (e.g., particular words or phrases present in the NL based input). Additionally, or alternatively, the selection criteria can include a determination that a corresponding response generated based on processing the particular NL based input has a quality metric below a threshold quality metric. The corresponding response can be generated at a previous time and retrieved from the LLM log database 131A and/or the example input data database 151A.

In some implementations, the quality metric can relate to whether the corresponding response to the NL based input 210 resulted in follow-up inputs. For instance, if the corresponding response resulted in one or more follow-up inputs from the user, it can be determined that the quality metric is below a threshold quality metric. In some additional or alternative implementations, the quality metric can relate to feedback provided by a user when provided the corresponding response. For instance, the user can provide a rating for the response (e.g., a score out of 10), or can provide binary feedback (e.g., a thumbs up or thumbs down).

Once the training instance(s) have been generated in this manner, the NL based response system 120 (or an LLM thereof), can be fine-tuned (or otherwise termed, trained) using the training instances stored in the training instance(s) database 132A (e.g., using training engine 132). This can be performed in any suitable way (e.g., supervised learning, reinforcement learning, etc.).

Figure 4:
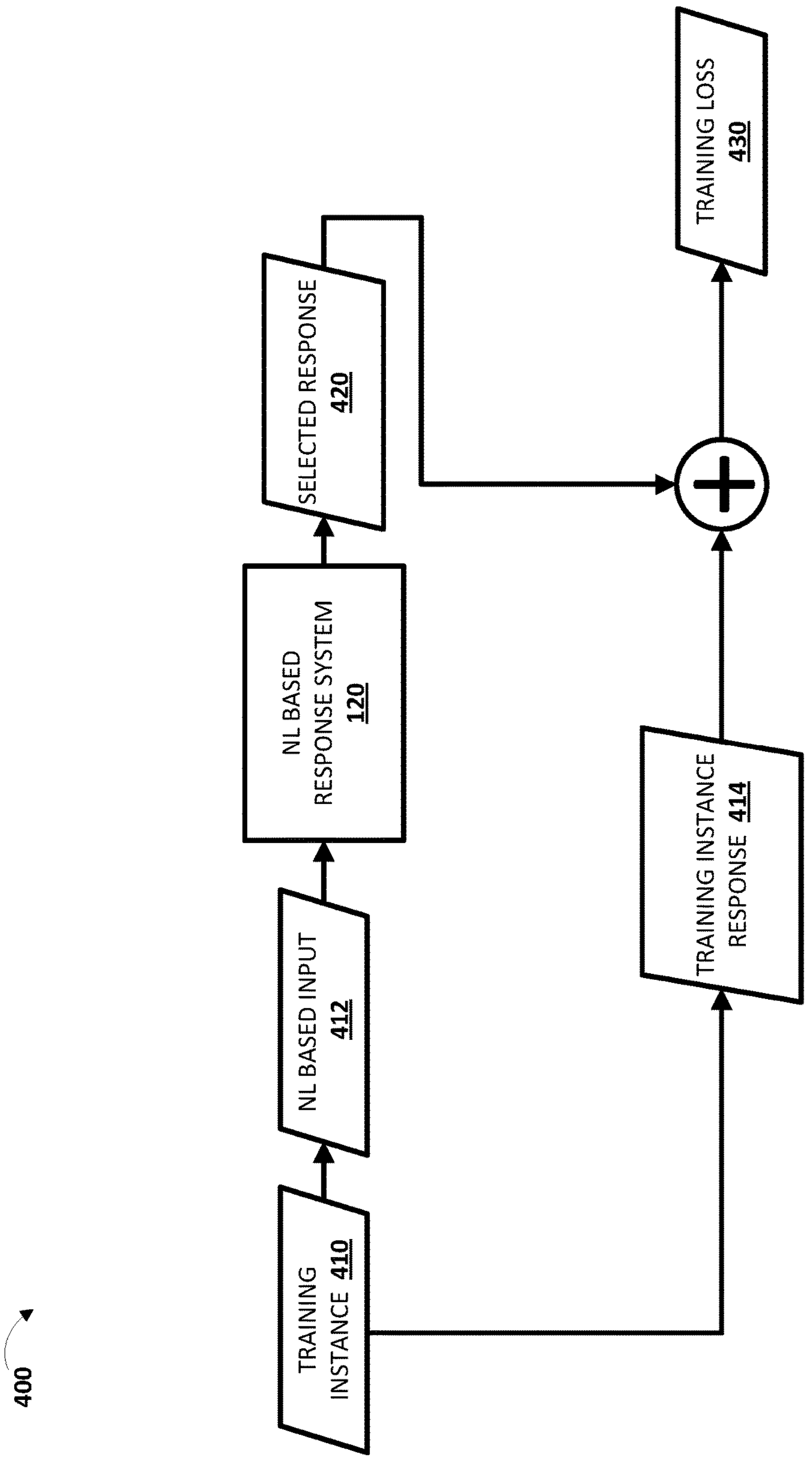
FIG. 4 depicts an example process flow for fine-tuning a large language model, in accordance with various implementations.

For instance, FIG. 4 depicts an example process flow 400 for fine-tuning a large language model (e.g., of an NL based response system 120). As shown in FIG. 4, an NL based input 412 and a training instance response 414 can be obtained from a particular training instance 410 (which can be retrieved, e.g., from training instance(s) database 132A). A final response 420 can be generated based on processing the NL based input 412 using the NL based response system 120 (or using an LLM thereof), for instance, as described in relation to FIG. 2A. The final response 420 can be compared with the training instance response 414 to generate a training loss 430. Comparing the final response 420 with the training instance response 414 can include, for instance, tokenization, natural language understanding (NLU), natural language processing (NLP), etc. For instance, rather than the responses themselves being compared, embeddings generated (in any suitable way) based on the responses can be compared to generate the training loss 430. Moreover, the NL based response system 120 (or an LLM thereof) can be updated based on the training loss 430. In some implementations, additional data (e.g., a critique response corresponding to the training instance response 414, one or more intermediate responses, etc) can be obtained from the training instance 410 as well, and used in generating the training loss.

Once the LLM (e.g., of the NL response system 120) has been fine-tuned, the fine-tuned LLM can be deployed for use in generating responses to NL based inputs. In some cases, the NL based response system 120 can be updated with the fine-tuned LLM for use in inference (e.g., in the manner described in relation to FIG. 2B, or in any other manner) or in further generation of training data and fine-tuning (e.g. in the manner described in relation to FIG. 2C).

Turning now to FIG. 5, a flowchart illustrating an example method 500 of utilizing an NL based response system to generate a response to an NL based input associated with a client device is depicted. For convenience, the operations of the method 500 are described with reference to a system that performs the operations. This system of the method 500 includes one or more processors, memory, and/or other component(s) of computing device(s) (e.g., the client device 110 of FIG. 1, the NL based response system 120 of FIGS. 1 to 4, computing device 710 of FIG. 7, one or more servers, and/or other computing devices). Moreover, while operations of the method 500 are shown in a particular order, this is not meant to be limiting. One or more operations may be reordered, omitted, and/or added.

At block 510, the system receives NL based input which is associated with a client device (e.g., in the same or similar manner described with respect to FIG. 2B, and/or in other manners described herein).

At block 520, the system generates, using an LLM, and based on processing the NL based input, LLM output. Generating the LLM output can be performed using a single inference call to the LLM.

In some implementations, the system can generate an LLM input based on the NL based input. The LLM input can include a plurality of requests and a plurality of fields for output that are responsive to the requests. For instance, the plurality of requests can include one or more of a first request based on the NL based input, at least one second request for generating the at least one intermediate LLM response, a third request for generating the final LLM response, at least one fourth request for generating a critique response for the at least one intermediate LLM response, etc. For instance, the plurality of requests can include a plurality of sequential second requests to direct the LLM to generate, for each of the second requests, a corresponding sequential intermediate LLM response. Additionally, or alternatively, plurality of requests can include a third request to direct the LLM to generate the final LLM response subsequent to the preceding intermediate LLM response. Additionally, or alternatively, the plurality of requests can include a fourth request to direct the LLM to generate an analysis of a respective intermediate LLM response and/or to identify areas of improvement for a respective intermediate LLM response.

In some implementations, the LLM input can be generated based on a predefined template (e.g., in addition to the NL based input). For instance, the LLM input can be generated based on modifying the predefined template to include the NL based input. In some implementations, the LLM input can be generated by further modifying the template, for instance, based on modification data. The modification data can be based on one or more of: the NL based input, information associated with a user of the client device, context data, etc. For instance, the LLM input can be generated based on modifying the number of second requests, the number of fourth requests and/or the content of at least one fourth request.

The system can then process the LLM input, using the LLM, to generate the LLM output. As such, the LLM output can be indicative of output that is responsive to the requests to be entered into each of the fields of the LLM input.

At block 530, the system determines, based on the LLM output, a sequence of LLM responses, including at least one intermediate LLM response and a final LLM response. The at least one intermediate response can be generated prior to the final response. In some implementations, the sequence of LLM responses can include a plurality of sequential intermediate LLM responses and the final LLM response. In such implementations, each subsequent one of the plurality of sequential intermediate LLM responses can be generated subsequent to a preceding one of the plurality of sequential intermediate LLM responses. In this way, the LLM can have access to additional information (e.g., at least the immediately preceding LLM response) when generating each LLM response.

In some implementations, the system can also determine, based on the LLM output, at least one critique response for each one of the intermediate LLM response. The critique responses can include, for instance, an analysis of the at least one intermediate LLM response, an indication of areas for improvement for the at least one intermediate LLM response, etc. In such implementations, the final LLM response can be generated based at least in part on the critique response of the intermediate LLM response that immediately precedes the final LLM response in the sequence of LLM responses. In this way, the LLM can have access to further additional information (e.g., at least the critique response of the immediately preceding LLM response) when generating each LLM response.

At block 540, the system causes the final LLM response to be rendered at the client device. In some implementations, the intermediate LLM response(s) and/or the critique response(s) (if included) may not be rendered at the client device (e.g., rendering of these responses can be bypassed). In this way, resources which would otherwise be consumed in transmitting and rendering the intermediate LLM response(s) can be conserved. In some implementations, the client device can be caused to render the intermediate LLM response(s) (e.g., one at a time, as a list, etc.) in addition to the final LLM response. Additionally, or alternatively, the client device can be caused to render reasoning information based on the critique response(s) (e.g., the reasoning information can include text from the critique response(s)). In this way, the user can be provided with additional information in relation to why the final LLM response was generated as it has been, which can provide insight into the internal workings of the NL based response system.

Figure 6:
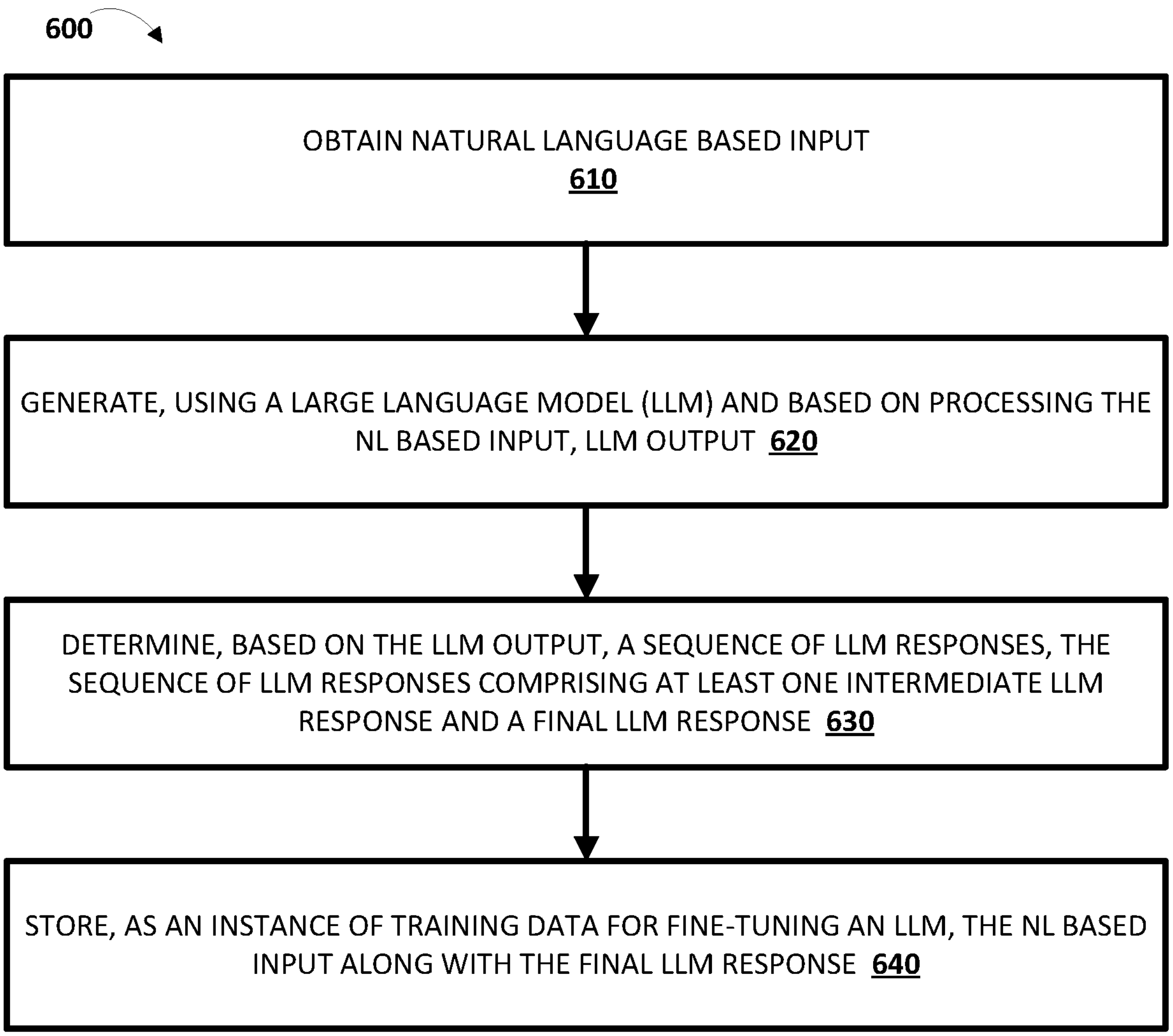
FIG. 6 depicts a flowchart illustrating an example method of generating training instances by utilizing an NL based response system to generate a response to an NL based input, in accordance with various implementations.

Turning now to FIG. 6, a flowchart illustrating an example method 600 of generating training instances by utilizing an NL based response system to generate a response to an NL based input is depicted. For convenience, the operations of the method 600 are described with reference to a system that performs the operations. This system of the method 600 includes one or more processors, memory, and/or other component(s) of computing device(s) (e.g., the client device 110 of FIG. 1, the NL based response system 120 of FIGS. 1 to 4, computing device 710 of FIG. 7, one or more servers, and/or other computing devices). Moreover, while operations of the method 600 are shown in a particular order, this is not meant to be limiting. One or more operations may be reordered, omitted, and/or added.

At block 610, the system obtains NL based input (e.g., in the same or similar manner described with respect to FIGS. 2C, and/or in other manners described herein). For instance, the NL based input can be obtained from a log of previously entered NL based inputs to the NL based response system (or another NL based response system) by one or more users.

At block 620, the system generates LLM output using an LLM and based on processing the NL based input (e.g., in the same or similar manner described with respect to block 520 of FIG. 5, and/or in other manners described herein).

At block 630, the system determines, based on the LLM output, a plurality of LLM responses including an initial LLM response and a final LLM response (e.g., in the same or similar manner described with respect to block 530 of FIG. 5, and/or in other manners described herein).

At block 640, the system stores, as an instance of training data for fine-tuning the LLM (or an additional LLM), the NL based input along with the final LLM response (e.g., in the same or similar manner described with respect to FIG. 3B, and/or in other manners described herein).

After one or more instances training data of training data have been generated, the LLM (or another LLM) can be fine-tuned based on, at least, the generated instances of training data (e.g., in the same or similar manner described with respect to FIG. 4, and/or in other manners described herein). In some implementations, this process can be repeated any number of times, to further fine-tune the LLM at each iteration. The fine-tuned LLM can then be deployed for use e.g., in an NL based response system (e.g., as described in relation to FIG. 1, or FIG. 2A). For instance, subsequent to the fine-tuning of the LLM, the system can receive an NL based input associated with a client device. The system can then generate an LLM response based on processing the NL based input associated with the client device using the fine-tuned LLM. The system can then cause the LLM response to be rendered at the client device.

Figure 7:
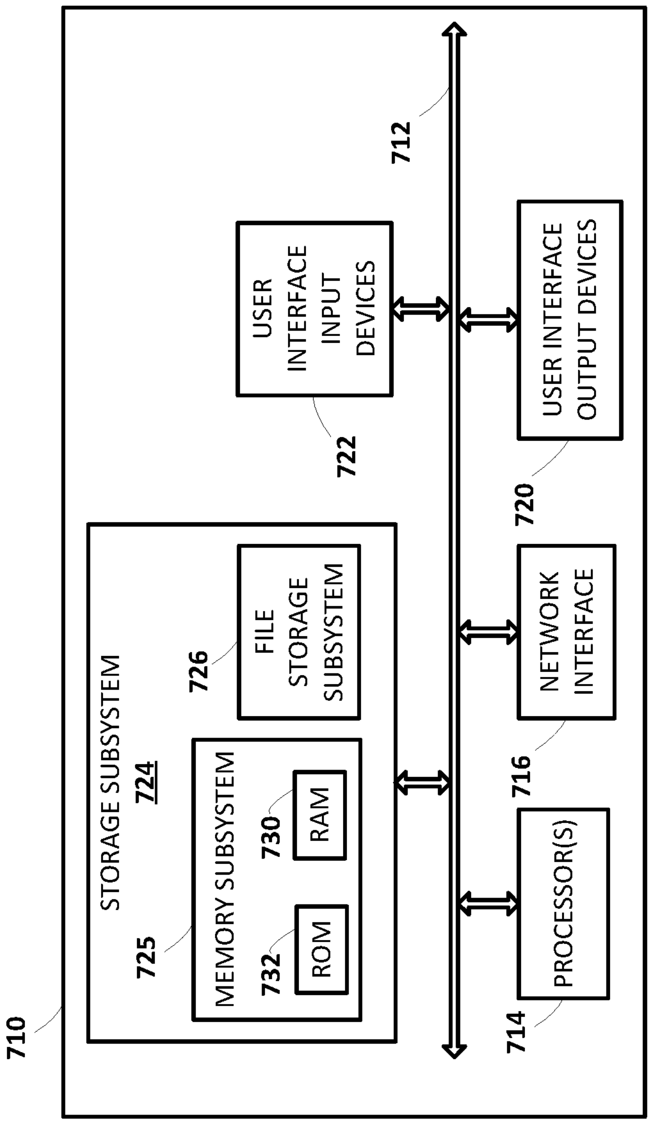
FIG. 7 depicts an example architecture of a computing device, in accordance with various implementations.

Turning now to FIG. 7, an example architecture of a computing device, in accordance with various implementations is depicted. In some implementations, one or more of a client device, cloud-based automated assistant component(s) or other cloud-based software application component(s), and/or other component(s) can include one or more components of the example computing device 710.

Computing device 710 typically includes at least one processor 714 which communicates with a number of peripheral devices via bus subsystem 712. These peripheral devices can include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 can include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 can use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or can make use of personal and/or monitored information), the users can be provided with an opportunity to control whether programs or features collect user information (e.g., information about a user's social network, social actions or activities, profession, a user's preferences, or a user's current geographic location), or to control whether and/or how to receive content from the content server that can be more relevant to the user. Also, certain data can be treated in one or more ways before it is stored or used, so that personal identifiable information is removed. For example, a user's identity can be treated so that no personal identifiable information can be determined for the user, or a user's geographic location can be generalized where geographic location information is obtained (such as to a city, ZIP code, or state level), so that a particular geographic location of a user cannot be determined. Thus, the user can have control over how information is collected about the user and/or used.

In some implementations, a method implemented by one or more processors is provided and includes: receiving NL based input associated with a client device; generating, using an LLM and based on processing the NL based input, LLM output; determining, based on the LLM output, a sequence of LLM responses, the sequence of LLM responses including at least one intermediate LLM response and a final LLM response; and causing the final LLM response to be rendered at the client device.

These and other implementations of technology disclosed herein can optionally include one or more of the following features.

In some implementations, generating the LLM output may be performed using a single inference call to the LLM.

In some additional or alternative implementations, the sequence of LLM responses may include a plurality of sequential intermediate LLM responses and the final LLM response. Each subsequent one of the plurality of sequential intermediate LLM response may be generated subsequent to a preceding one of the plurality of sequential intermediate LLM responses.

In some additional or alternative implementations, the method may further include: determining, based on the LLM output, a critique response of the at least one intermediate LLM response. The final LLM response may be generated based at least in part on the critique response of the intermediate LLM response that immediately precedes the final LLM response in the sequence of LLM responses. In some versions of those implementations, the critique response may include an analysis of the at least one intermediate LLM response and/or an indication of areas for improvement for the at least one intermediate LLM response.

In some additional or alternative implementations, generating, using the LLM and based on processing the NL based input, the LLM output may include: generating an LLM input based on the NL based input; and processing, using the LLM, the LLM input to generate the LLM output. In some versions of those implementations, the LLM input may include a plurality of requests and a plurality of fields for output that are responsive to the requests, and the LLM output may be indicative of output that is responsive to the requests to be entered into each of the fields. In some further versions of those implementations the plurality of requests may include a first request based on the NL based input, at least one second request for generating the at least one intermediate LLM response, and a third request for generating the final LLM response. In some additional or alternative versions of those implementations, the plurality of requests may further include at least one fourth request for generating a critique response for the at least one intermediate LLM response.

In some additional or alternative versions of those implementations, generating the LLM input may be based on a predefined template. In some versions of those implementations, generating the LLM input may further include modifying the template based on modification data. The modification data may be based on one or more of: the NL based input, information associated with a user of the client device, or context data.

In some additional or alternative implementations, the method may further include bypassing rendering of the at least one intermediate LLM response at the client device.

In some implementations, the method may further include causing the sequence of LLM responses to be rendered sequentially at the client device. In some additional or alternative implementations, the method may further include causing reasoning information to be rendered at the client device, wherein the reasoning information may be based on a critique response of the at least one intermediate LLM response determined from the LLM output.

In some implementations, a method implemented by one or more processors is provided and includes: obtaining NL based input; generating, using an LLM and based on processing the NL based input, LLM output; determining, based on the LLM output, a plurality of LLM responses, the plurality of LLM responses including an initial LLM response and a final LLM response; and storing, as an instance of training data for fine-tuning the LLM or an additional LLM, the NL based input along with the final LLM response.

These and other implementations of technology disclosed herein can optionally include one or more of the following features.

In some implementations, generating the LLM output may be performed using a single inference call to the LLM.

In some additional or alternative implementations, the sequence of LLM responses may include a plurality of sequential intermediate LLM responses and the final LLM response. Each subsequent one of the plurality of sequential intermediate LLM responses may be generated subsequent to a preceding one of the plurality of sequential intermediate LLM responses.

In some additional or alternative implementations, the method may further include: determining, based on the LLM output, a critique response of the at least one intermediate LLM response. The final LLM response may be generated based at least in part on the critique response of the intermediate LLM response that immediately precedes the final LLM response in the sequence of LLM responses. In some versions of those implementations, the critique response may include an analysis of the at least one intermediate LLM response and/or an indication of areas for improvement for the at least one intermediate LLM response.

In some additional or alternative implementations, generating, using the LLM and based on processing the NL based input, the LLM output may include: generating an LLM input based on the NL based input; and processing, using the LLM, the LLM input to generate the LLM output. In some versions of those implementations, the LLM input may include a plurality of requests and a plurality of fields for output that are responsive to the requests, and the LLM output may be indicative of output that is responsive to the requests to be entered into each of the fields. In some further versions of those implementations the plurality of requests may include a first request based on the NL based input, at least one second request for generating the at least one intermediate LLM response, and a third request for generating the final LLM response. In some additional or alternative versions of those implementations, the plurality of requests may further include at least one fourth request for generating a critique response for the at least one intermediate LLM response.

In some additional or alternative versions of those implementations, generating the LLM input may be based on a predefined template. In some versions of those implementations, generating the LLM input may further include modifying the template based on modification data. The modification data may be based on one or more of: the NL based input, information associated with a user of a client device associated with the NL based input, or context data.

In some additional or alternative implementations, the method may further include fine-tuning the LLM based on the training data. In some versions of those implementations, the method may further include, subsequent to fine-tuning the LLM, receiving an NL based input associated with a client device; generating an LLM response based on processing the NL based input associated with the client device using the fine-tuned LLM; and causing the LLM response to be rendered at the client device.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device;

generating, using a large language model (LLM) and based on processing the NL based input, LLM output;

determining, based on the LLM output, a sequence of LLM responses, wherein the sequence of LLM responses comprises at least one intermediate LLM response that is responsive to the NL based input, at least one critique response of the at least one intermediate LLM response, and a final LLM response that is responsive to the NL based input, and wherein determining the sequence of LLM responses based on the LLM output comprises:

determining the at least one intermediate response that is responsive to the NL based input;

determining the at least one critique response based on analyzing the at least one intermediate response, wherein the at least one critique response identifies one or more areas for improvement in the at least one intermediate response, and wherein the at least one critique response is tailored to the at least one intermediate LLM response; and determining, based on the at least one critique response and the at least one intermediate response, the final LLM response that is responsive to the NL based input, wherein the final LLM response is a refinement of the at least one intermediate response based on the one or more areas for improvement identified by the at least one critique response;

causing the final LLM response to be rendered at the client device;

storing, as a training instance, the NL based input, the at least one intermediate response, the at least one critique response, and the final LLM response; and causing the LLM or an additional machine learning (ML) model to be trained based on the training instance.

2. The method of claim 1, wherein generating the LLM output is performed using a single inference call to the LLM.

3. The method of claim 1, wherein the sequence of LLM responses comprises a plurality of sequential intermediate LLM responses and the final LLM response, wherein each subsequent one of the plurality of sequential intermediate LLM responses is generated subsequent to a preceding one of the plurality of sequential intermediate LLM responses.

4. The method of claim 1, wherein the final LLM response is generated based at least in part on the critique response of the intermediate LLM response that immediately precedes the final LLM response in the sequence of LLM responses.

5. The method of claim 4, wherein the critique response further comprises an analysis of the at least one intermediate LLM response.

6. The method of claim 1, wherein generating, using the LLM and based on processing the NL based input, the LLM output comprises:

generating an LLM input based on the NL based input; and processing, using the LLM, the LLM input to generate the LLM output.

7. The method of claim 6, wherein the LLM input comprises a plurality of requests and a plurality of fields for output that are responsive to the requests, and wherein the LLM output is indicative of output that is responsive to the requests to be entered into each of the fields.

8. The method of claim 7, wherein the plurality of requests comprises a first request based on the NL based input, at least one second request for generating the at least one intermediate LLM response, and a third request for generating the final LLM response.

9. The method of claim 7, wherein the plurality of requests further comprises at least one fourth request for generating a critique response for the at least one intermediate LLM response.

10. The method of claim 6, wherein generating the LLM input is based on a predefined template.

11. The method of claim 10, wherein generating the LLM input further comprises modifying the template based on modification data.

12. The method of claim 11, wherein the modification data is based on one or more of: the NL based input, information associated with a user of the client device, or context data.

13. The method of claim 1, further comprising:

bypassing rendering of the at least one intermediate LLM response at the client device.

14. The method of claim 1, further comprising:

causing the sequence of LLM responses to be rendered sequentially at the client device.

15. The method of claim 1, further comprising:

causing reasoning information to be rendered at the client device, wherein the reasoning information is based on a critique response of the at least one intermediate LLM response determined from the LLM output.

16. A system comprising:

one or more hardware processors; and memory storing instructions that, when executed by the one or more hardware processors, cause the one or more hardware processors to perform operations comprising:

receiving natural language (NL) based input associated with a client device;

generating, using a large language model (LLM) and based on processing the NL based input, LLM output;

determining, based on the LLM output, a sequence of LLM responses, wherein the sequence of LLM responses comprises at least one intermediate LLM response that is responsive to the NL based input, at least one critique response of the at least one intermediate LLM response, and a final LLM response that is responsive to the NL based input, and wherein determining the sequence of LLM responses based on the LLM output comprises:

determining the at least one intermediate response that is responsive to the NL based input;

determining the at least one critique response based on analyzing the at least one intermediate response, wherein the at least one critique response identifies one or more areas for improvement in the at least one intermediate response, and wherein the at least one critique response is tailored to the at least one intermediate LLM response; and determining, based on the at least one critique response and the at least one intermediate response, the final LLM response that is responsive to the NL based input, wherein the final LLM response is a refinement of the at least one intermediate response based on the one or more areas for improvement identified by the at least one critique response; causing the final LLM response to be rendered at the client device;

storing, as a training instance, the NL based input, the at least one intermediate response, the at least one critique response, and the final LLM response; and cause the LLM or an additional machine learning (ML) model to be trained based on the training instance.

17. The system of claim 16, wherein the sequence of LLM responses comprises a plurality of sequential intermediate LLM responses and the final LLM response, wherein each subsequent one of the plurality of sequential intermediate LLM responses is generated subsequent to a preceding one of the plurality of sequential intermediate LLM responses.

18. The system of claim 16, wherein the one or more hardware processors further cause the one or more hardware processors to perform operations comprising:

bypassing rendering of the at least one intermediate LLM response at the client device.

19. A non-transitory computer-readable storage medium storing instructions that, when executed by one or more hardware processors, cause the one or more hardware processors to perform operations comprising:

receiving natural language (NL) based input associated with a client device;

generating, using a large language model (LLM) and based on processing the NL based input, LLM output;

determining, based on the LLM output, a sequence of LLM responses, wherein the sequence of LLM responses comprises at least one intermediate LLM response that is responsive to the NL based input, at least one critique response of the at least one intermediate LLM response, and a final LLM response that is responsive to the NL based input, and wherein determining the sequence of LLM responses based on the LLM output comprises:

determining the at least one intermediate response that is responsive to the NL based input;

determining the at least one critique response based on analyzing the at least one intermediate response, wherein the at least one critique response identifies one or more areas for improvement in the at least one intermediate response, and wherein the at least one critique response is tailored to the at least one intermediate LLM response; and determining, based on the at least one critique response and the at least one intermediate response, the final LLM response that is responsive to the NL based input, wherein the final LLM response is a refinement of the at least one intermediate response based on the one or more areas for improvement identified by the at least one critique response; causing the final LLM response to be rendered at the client device;

storing, as a training instance, the NL based input, the at least one intermediate response, the at least one critique response, and the final LLM response; and causing the LLM or an additional machine learning (ML) model to be trained based on the training instance.

* * * * *